Feb. 8, 1944.  W. S. TIMBLIN  2,341,399
UMBRELLA AND METHOD OF AND APPARATUS FOR MANUFACTURING SAME
Filed Feb. 27, 1941  7 Sheets-Sheet 1

Inventor:
William S. Timblin,
By Chritton, Wiles, Davies & Hirschl
Attys

Feb. 8, 1944. W. S. TIMBLIN 2,341,399
UMBRELLA AND METHOD OF AND APPARATUS FOR MANUFACTURING SAME
Filed Feb. 27, 1941 7 Sheets-Sheet 4

Inventor:
William S. Timblin,
By Chritton, Wiles, Davies & Hirschl,
Attys.

Feb. 8, 1944. W. S. TIMBLIN 2,341,399
UMBRELLA AND METHOD OF AND APPARATUS FOR MANUFACTURING SAME
Filed Feb. 27, 1941 7 Sheets-Sheet 6

Inventor:
William S. Timblin,
By Critton, Wiles, Davies & Hirschl,
Attys.

Feb. 8, 1944.   W. S. TIMBLIN   2,341,399
UMBRELLA AND METHOD OF AND APPARATUS FOR MANUFACTURING SAME
Filed Feb. 27, 1941   7 Sheets-Sheet 7

Inventor:
William S. Timblin,
By Critton, Wiles, Davies & Hirschl
Attys.

Patented Feb. 8, 1944

2,341,399

UNITED STATES PATENT OFFICE 2,341,399

UMBRELLA, AND METHOD OF AND APPARATUS FOR MANUFACTURING SAME

William S. Timblin, Oak Park, Ill.

Application February 27, 1941, Serial No. 380,926

29 Claims. (Cl. 135—20)

My invention relates more particularly, though not exclusively, to the manufacture of umbrellas provided, more especially, to be purchased and used in case of emergency and desired to be produced at vastly less cost than the standard type of umbrella provided for long continued use.

One of my objects is to provide an umbrella which may be made to sell at such a low price that it will have a ready market where an umbrella, not suitable for the repeated use as in the case of standard umbrellas, is desired, as for example and more especially in the case of emergencies.

Another object is to provide an umbrella of such construction that the bows commonly forming parts of umbrellas and to which the ribs forming parts of the umbrella opening and closing means, are pivoted, are eliminated, thereby greatly reducing the cost of the construction.

Another object is to provide a novel method and apparatus for the economical production of such umbrellas; and other objects as will be manifest from the following description.

Referring to the accompanying drawings.

According to the more particular illustrated embodiment of my invention the umbrella comprises, generally stated, a shaft portion 20 which, in accordance with common practice, would be provided at one end with a handle (not shown) by which to carry the umbrella, the shaft 20 being preferably made of wood; a canopy or cover section 21; spreaders 22 in the form of bars preferably of wood the upper surfaces of which are flat (the spreaders shown being of rectangular shape in cross section); a sleeve 23 slidable on the shaft 20 and by the movement of which along the shaft the umbrella is opened and closed, as desired; and means 32 for releasably retaining the umbrella in open condition.

Figure 1:
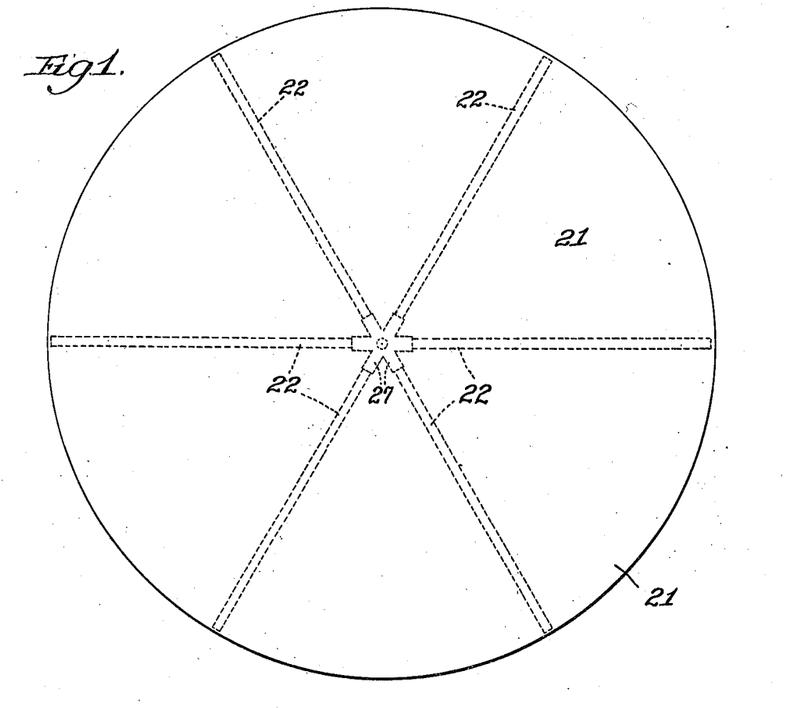
Figure 1 is a plan view of an umbrella embodying my invention and constructed in accordance with my novel method and apparatus, the umbrella being shown in fully open position.
Figure 2:
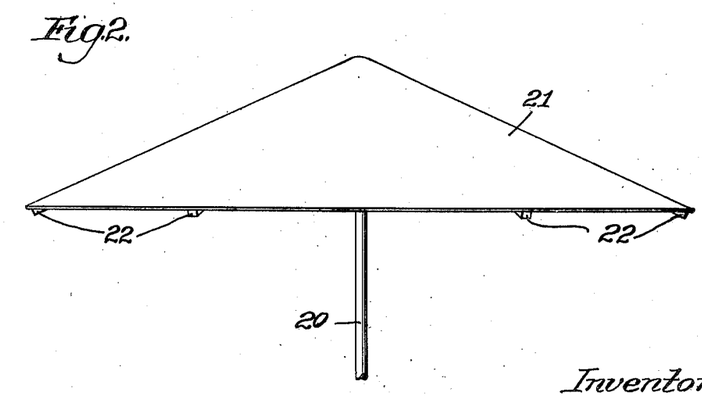
Figure 2 is a view in side elevation of the umbrella.
Figure 3:
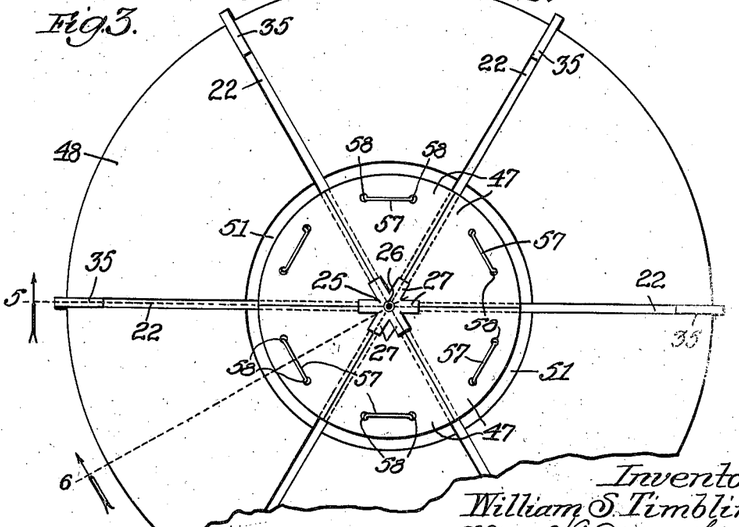
Figure 3 is a plan view, with a portion thereof broken away, of the form portion of an apparatus constructed in accordance with my invention and by which my novel method may be practiced.

The canopy or cover section 21 may be made of any suitable material. Preferably it is formed of waterproof paper, as for example kraft paper of from 20 to 30 lbs. to the ream basis weight, and provided as for example in the form of a cone as hereinafter described; the canopy or cover section, being connected at its margin with the outer ends of the spreaders 22 and especially when the canopy or cover section is made of relatively fragile material, such as for example the paper referred to, connected at its central portion to an anchoring and reinforcing member 25 secured to the upper end of the shaft 20 and preferably in the form of a spider from the central portion of which, at which it is secured to the shaft as for example by a tack 26, the radial arms 27 of the spider extend. The spider member may be made of any suitable material such, as for example kraft paper of about 200 lbs. per ream basis weight and its arms 27 are preferably provided of the same number as the spreaders 22 with which they aline as shown in Fig. 1.

The sleeve 23 may be made from a section of a paper tube having flanges 28 and 29 at its upper and lower ends, respectively, the flange 28, by way of example, being in the form of a washer, and the flange 29, by way of example, being formed of a paper tube of larger diameter than that from which the body of the sleeve 23 is made, telescoped with the lower end of the smaller tube and secured thereto as for example by glue.

The spreaders 22 are grouped at their inner ends about the sleeve 23 between its flanges, in the manner of a hinge, as for example and preferably by threading through holes 30 in the inner ends of the spreaders, a length of cord 31 or any other suitable material, and thereafter tying together the ends of the cord to confine the spreaders about the sleeve, the flanges 28 and 29 at the ends of the sleeve insuring the actuation of the spreaders in the movement of the sleeve along the shaft 20 and preventing accidental separation of the spreaders and sleeve.

In accordance with this construction the umbrella is opened, viz., the canopy 21 is unfolded from collapsed condition to spread condition for use, by the operator sliding the sleeve 23 downwardly on the shaft 20 which causes the spreaders 22, in moving at their inner ends downwardly on the shaft, to exert a spreading action on the canopy, by reason of their connection at their outer ends with the margin of the canopy thereby causing the canopy to become tensioned and assume conical form. In the closing of the umbrella, viz., the manipulation of its parts to a position in which the canopy extends in folded condition lengthwise of the shaft, the spreaders, at their inner ends move with the sleeve, upwardly along the shaft, the provision of the central reinforcing member 25 with its radiating arms 27 permitting the canopy to fold down around the shaft.

The spreaders 22 are provided of such length that when the canopy is spread into conical form to condition it for use, the inner ends of the spreaders will extend to points above the points of connection of the outer ends of the spreaders with the canopy. Thus in the final movement of the spreaders in the umbrella-opening operation, they exert considerable radial pressure against the margin of the canopy thereby causing the canopy to become taut with resultant endwise thrust on the spreaders which, because of their upwardly inclined position, tends to force the spreaders and sleeve upwardly along the shaft.

The means 24 for releasably retaining the umbrella in open condition may be of any desirable construction, those shown being especially desirable as they serve to automatically releasably hold the spreaders 22 in any desired position of adjustment along the shaft 20 in the movement of the sleeve 23 downwardly to open the umbrella, whereby the operator may tension the canopy to any degree desired regardless of permanent stretching or shrinking of the parts of the umbrella particularly the canopy, which is apt to permanently stretch or shrink when it is made of paper.

The means 24 of the form shown comprise a clip-like member formed of a strip 32 of spring sheet metal having openings 33 and 34 at its opposite ends. The strip 32 is bent from its normal straight condition into bowed or arched spring tensioned condition as shown in which condition the sleeve 23 extends through the opening 33, and the shaft 20, at a portion below the sleeve 23, extends through the opening 34, these openings being slightly larger than the sleeve and shaft which extend therethrough. The clip thus provided operates to permit the sleeve 23 to freely slide down on the shaft 20 when the operator pushes down on the sleeve, the lower end of the strip 32 yielding upwardly in this movement, but to automatically clutch the shaft and sleeve together for releasably holding the sleeve against upward movement on the shaft responsive to the inward thrust of the canopy against the outer ends of the inclined spreaders 22 when the operator discontinues downward pressure on the sleeve.

The clutching means referred to are not only automatic to releasably hold the canopy in spread condition as stated, but are also automatic in the operation of closing the umbrella in that the operator in sliding his fingers upwardly along the shaft 20 and into engagement with the lower end of the strip 32 to raise the sleeve 23, automatically flexes the strip 32 in a direction to release the clutch action, permitting the clutch-clip and sleeve to slide easily to the top of the shaft in which operation the canopy 21 collapses around the shaft.

In accordance with a certain phase of my invention I provide for the rapid and economical assembling of the canopy 21 with the spider member 25 and the spreaders 22 as a factor in the production of an inexpensive form of umbrella. To this end I provide for the securing of the canopy 21 to the outer ends of the spreaders 22 and to the spider member 25, when used, by the simple and inexpensive operation of heat-sealing these parts together, preferably simultaneously, and involving the use of any suitable thermoplastic material at the surfaces to be secured together. Preferably the heat-sealing material to be used is of a flexible waterproof character and it is preferably provided as a coating entirely covering both the inside and outside of the canopy 21 and the spider member 25 and as a coating for such of the surfaces of the spreaders 22 as are to be adhered to the canopy. A highly desirable coating for this purpose is hydrochlorinated rubber (paper suitable for my use and coated with such a material being well known in the art). In the case of the spreaders their outer end portions may be enveloped in such coated paper as represented at 35 and the paper secured in place by touching it with a hot iron, the paper forming caps for the ends of the spreaders.

In the use of heat-sealing material as stated the operation of adhering or sealing together the parts to be connected together, involves merely the pressing of a hot iron against the flatwise opposed parts to be connected together for such short time as to render the coating plastic and adhesive whereupon the parts become welded together. By way of example, the iron used may be of a temperature about 250° F. requiring contact of a few seconds only with the parts to be connected together to produce the desired weld.

The feature of heat-sealing may also be used in the rapid and economical forming of the canopy 21. Thus, as illustrated in Figs. 11 to 14, inclusive, and by way of example, the canopy is formed of a square blank 36 of paper folded upon itself midway between opposite edges thereof producing a folded edge 37 at one side of the blank. A hot iron in the form of a narrow bar having a straight edge is then applied flatwise to the blank to extend at an angle of about 15° to the folded edge 37 from a point midway between the ends of this folded edge to the margin of the blank and seal off this portion of the folded blank, the boundary lines of the seal being represented at 38 and 39. The blank is then trimmed along the dotted curved line 40 and the portion of the blank lying between the line 39 and the folded edge 37 of the sheet trimmed off along the line 39.

It may be stated that, if desired, and as another of the various ways in which the canopy may be formed, the sheet from which the canopy is to be formed may be provided as a circular sheet, instead of a square sheet, in which case the sheet would be folded along its diameter and a segment thereof sealed off as described above as to the square sheet.

In all cases the blank after trimming as stated, is preferably turned inside out to cause the seam bounded by the lines 38 and 39 to be at the inside surface of the conical member thus formed.

As a means for quickly and economically sealing the canopy 21 to the spreaders 22 and the spider member 25 I have devised the simple and inexpensive construction of apparatus illustrated in Figs. 5 to 10, inclusive, of which the following is a description.

The apparatus shown and which is of the nature of a form comprises a base portion 41 shown as mounted on the top 42 of a bench and to which the parts of the umbrella to be heat-sealed are applied, and a hood or cap portion 43 for cooperation therewith to perform the heat-sealing operation.

The base portion is in the form of a cone of such shape and size that the canopy 21 may conformingly fit it, the base portion 41 having an opening 44 coincident with its apex extending therethrough and registering with an opening 45 in the bench-top 42 and provided to receive the umbrella-shaft 20 and the sleeve 23.

The upper conical surface of the base-portion 41 is grooved radially, as represented at 46, from the apex of the cone to its circumference, the grooves 46 being equidistantly spaced around the cone and of a number corresponding with the number of spreaders 22 of which the umbrella is to be formed.

The bottoms of the grooves 46 are of the proper depth and pitch from the center of the cone to its circumference, for maintaining the spreaders 22, when dropped into place in these grooves, in substantially the conical plane in which they extent when the completed umbrella is in the correct open position.

The base portion of the apparatus also comprises radially disposed segment-shaped supports 47 for the radial arms 27 of the spider member 25 during the heat-sealing operation, these supports which, when in operating position Figs. 5, 6, 9 and 10 form, in effect a continuous ring at the apex of the base 41 extending across the inner ends of the grooves 46, being radially movable outwardly to adapt them to be retracted at will to uncover the grooves 46 and permit of the positioning of the spreaders 22 in the grooves preliminary to the heat-sealing operation and the removal thereof from these grooves after the heat-sealing operation.

In the particular construction shown the base portion 41 is formed of alternating segmental hollow blocks and plates 48 and 49, respectively, secured to the bench-top 42, the grooves 46 being formed between the blocks 48 and the plates 49. The upper surfaces of the blocks 48 are in the form of segments of a cone and form a seating surface for the canopy 21 to be heat-sealed to other parts as above referred to. The upper edges of the plates 49 which form the bottoms of the grooves 46 incline upwardly toward the center of the base.

Figure 9:
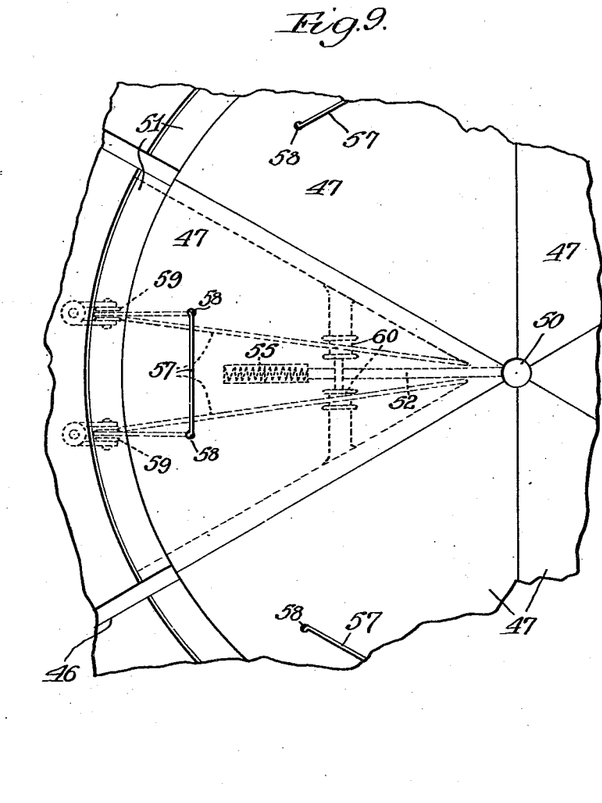
Figure 9 is a fragmentary plan view of the apparatus of Figs. 5 and 6 (with the umbrella parts omitted).
Figure 10:
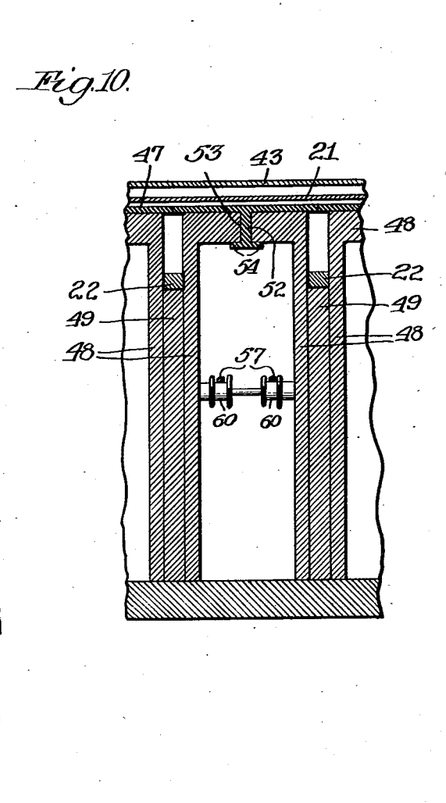
Figure 10 is a fragmentary sectional view taken at the irregular line 10 on Fig. 6 and viewed in the direction of the arrow.
Figures 11, 12, 13, 14:
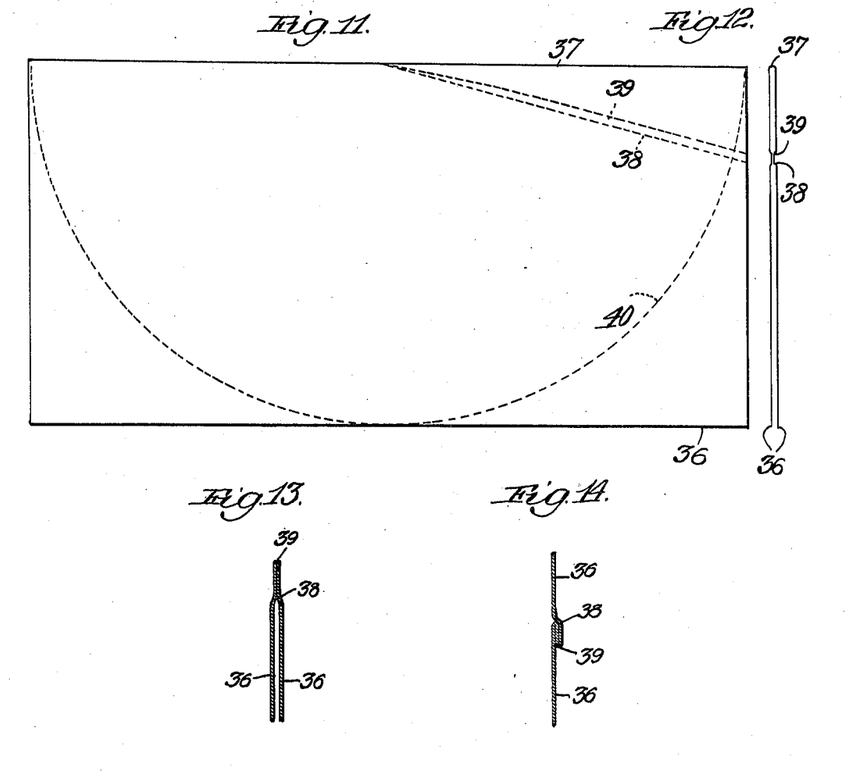
Figure 11 is a plan view illustrating steps performed in the producing of the canopy of the umbrella.
Figure 12 is an edge of the structure shown in Fig. 11.
Figure 13 is a fragmentary sectional view of the structure of Fig. 11.
Figure 14 is a fragmentary sectional view of the complete canopy.
Figures 15, 16:
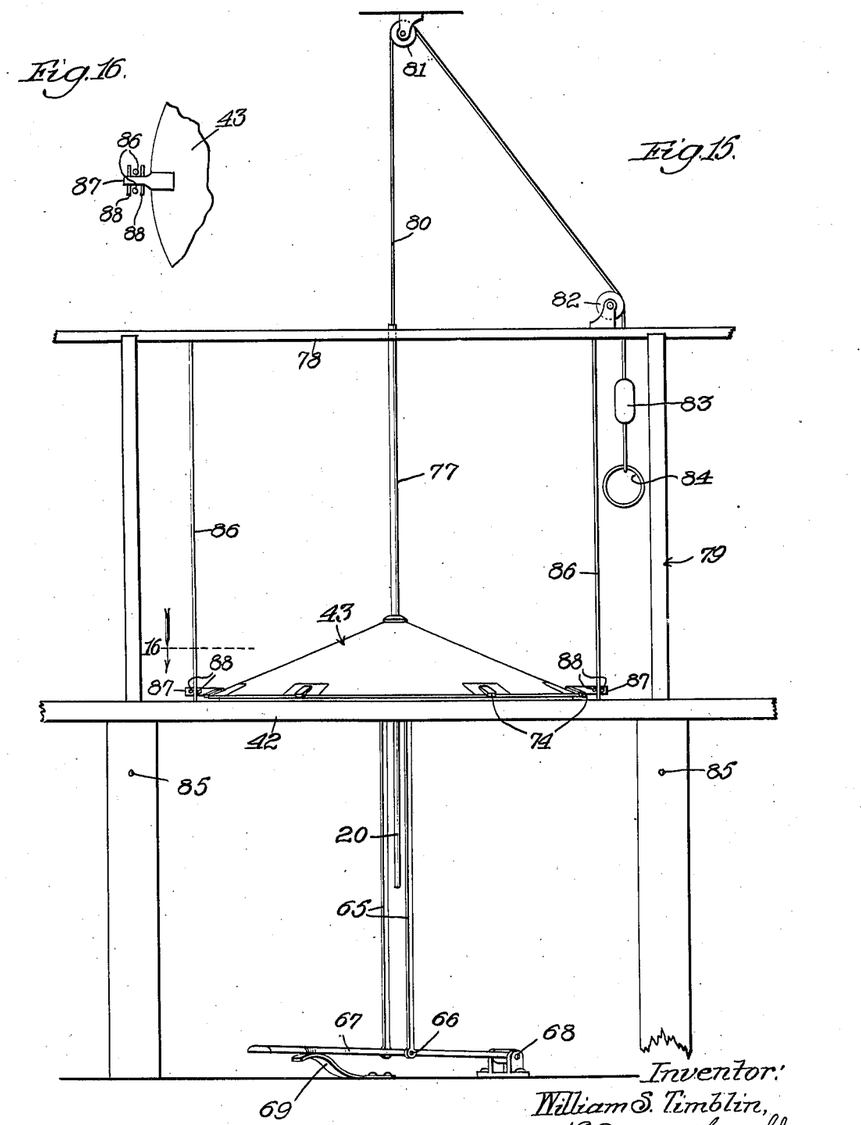
Figure 15 is a view in side elevation of the complete apparatus.
Figure 16, a fragmentary sectional view, the section being taken at the line 16 on Fig. 15 and viewed in the direction of the arrow.

The segment-shaped supports 47 which are provided of the same number as the spreaders 22 are shown as in the form of plates, the inner ends of which are cut off to provide a central opening 50 as shown in Figs. 3, 5, 6, 9 and 10 of a diameter slightly larger than that of the upper end of the shaft 20, when the plates 47 are in edge-abutting set position, the plates being so disposed about the vertical axis of the base 42 that the radial edges of adjacent plates abut along the medial lines of the grooves 46 as shown in Figs. 9 and 10.

It is desired that the upper surfaces of the support-plates 47 not extend above the upper surfaces of the blocks 48 and to this end the upper surfaces of the inner ends of the blocks are recessed as shown at 51 in which recessed portions the support-plates 47 are located and radially slidable, the support plates 47 being guided for radial movement by fins depending therefrom into elongated radial slots in the upper walls of the radial blocks 48, the fin and slot for one of the plates being shown at 52 and 53, respectively, with flanges 54 on the fin to confine the plate 47 on the block.

In the particular construction shown the support-plates 47 are normally yieldingly held in the closely grouped relation shown in Figs. 5, 6, 9 and 10 as by means of coil-springs 55 (the spring for one support-plate only being shown) interposed between the outer end of the fin 53 and the end wall of the slot 53 in which it is located, socketed as indicated at 56 to receive the spring.

Mechanism is provided in the construction shown for simultaneously moving the support-plates 47 radially outwardly at will, this mechanism as shown comprising for each support plate 47 a cord 57 threaded through openings 58 in the plate 47 with its ends passing over pairs of pulleys 59 and 60 journaled on the adjacent block 48. The ends of each cord 57 are connected as indicated at 61, to a ring 62 having depending lugs 63 pivotally connected at 64 to links 65 pivotally connected at 66 to a treadle 67 pivoted to the floor at 68 and normally yieldingly upwardly pressed by a spring 69. As will be understood, depressing the treadle 67 lowers the ring 62 thus drawing on the cords 58 which slide the support-plates 47 radially outwardly against the resistance of the springs 58, the spring 69 preferably substantially counterbalancing the weight of the treadle and the parts supported thereby, whereby the springs 55 may be relatively light to perform their function above described.

It may here be stated that preliminary to the heat-sealing of the canopy 21 to the spreaders 22 and the spider member 25, the shaft 20, spider member 25, sleeve 23 and spreaders 22 assembled to the position shown, are applied to the form to position the shaft 20 and sleeve 23 in the central opening in the form, the spreaders 22 in the grooves 46 and the arms of the spider member 25 upon the upper inner surfaces of the support-plates 47 which latter preliminary to the insertion of the spreaders 22 into the grooves 46 are drawn radially outwardly by the operator, by depressing the treadle 67 to uncover the inner ends of these grooves to open these grooves to receive the spreaders. The canopy is then applied to the form to the position shown in which position it flatwise opposes the spider member and the outer ends of the spreaders.

The heat-sealing of the parts referred to is accomplished in the particular apparatus shown by placing upon the canopy 21 thus positioned, the hood-like conical member 43 which is supported for vertical movement into and out of position on the canopy.

The member 43 is provided with any suitable heater elements for engaging the portion of the canopy which flatwise opposes the spider member 25 and the ends of the spreaders 22.

Figure 4:
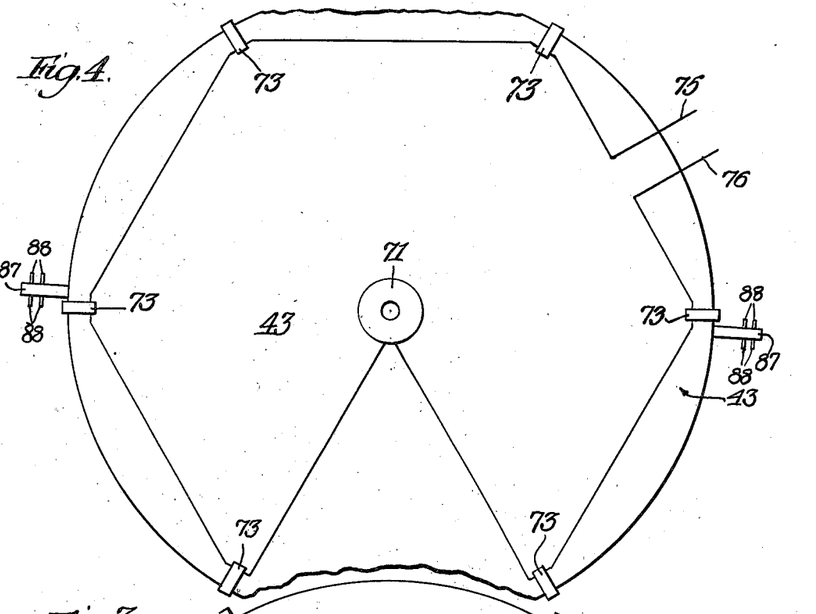
Figure 4 is a bottom view of a hood member forming a part of the apparatus certain portions thereof being broken away.
Figure 5:
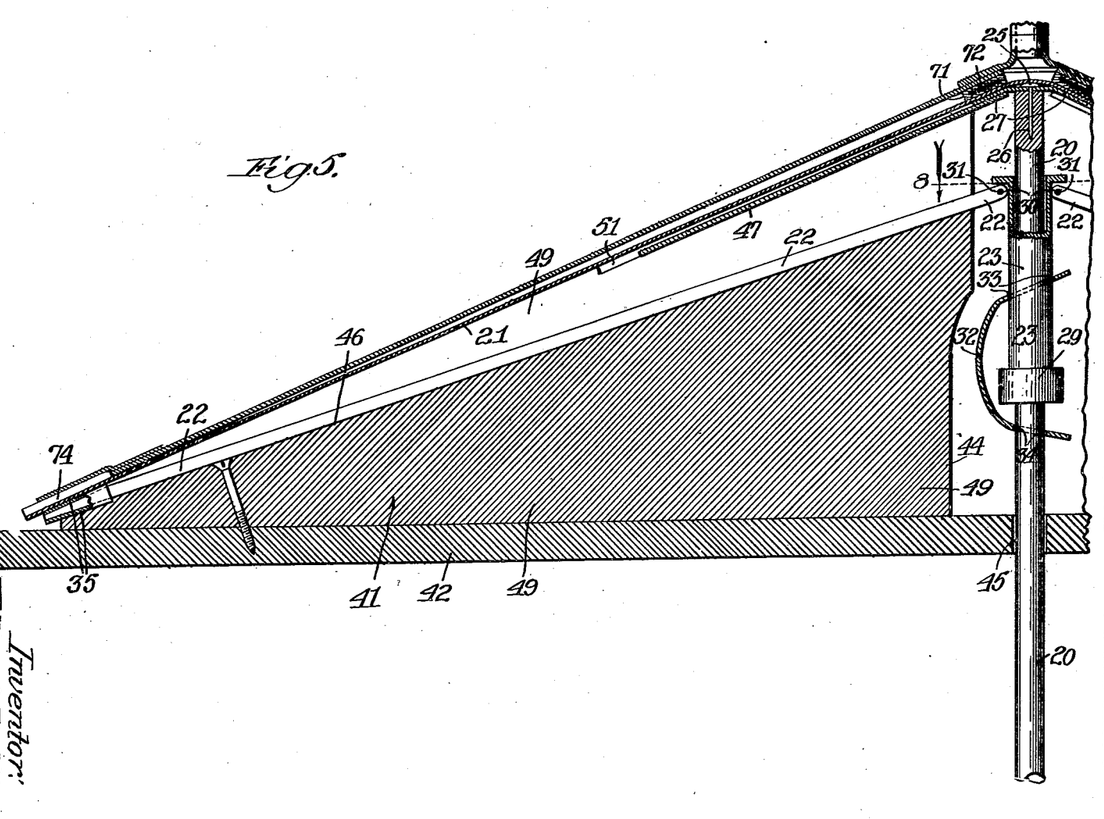
Figure 5 is an enlarged fragmentary sectional view of the apparatus illustrating the manner of assembling therewith the parts of the umbrella to be operated on by the apparatus, the section being taken at the line 5 on Fig. 3 and viewed in the direction of the arrow.
Figures 6, 7, 8:
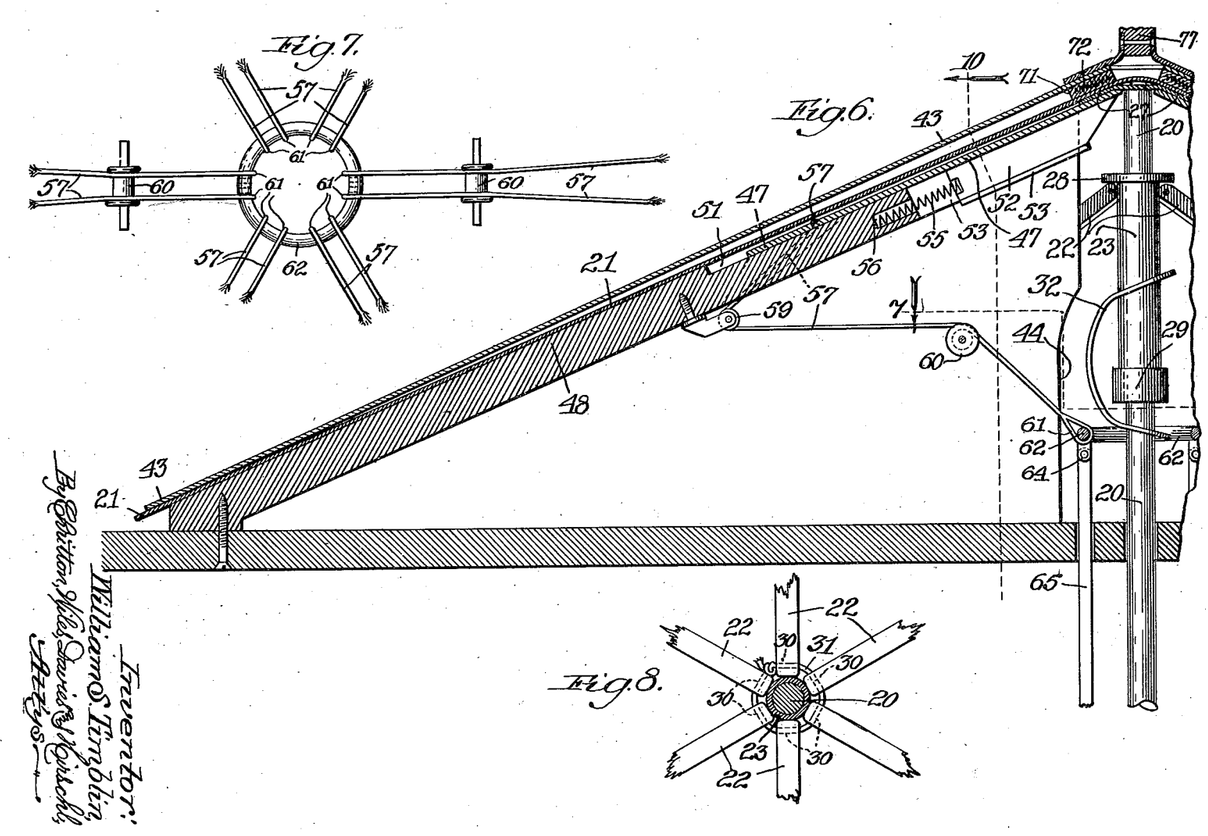
Figure 6 is a similar view of the apparatus of Fig. 5, the section being taken at the line 6 on Fig. 3 and viewed in the direction of the arrow.
Figure 7 is a broken plan sectional view taken at the irregular line 7 on Fig. 6 and viewed in the direction of the arrow.
Figure 8 is a fragmentary plan sectional view taken at the line 8 on Fig. 5 and viewed in the direction of the arrow.

The heater element for engaging the canopy at the portion thereof flatwise opposing the spider member 25 is in the form of a metal ring 71 shown as containing an electrical heating coil 72, and the heater elements for engaging the portions of the canopy 21 which register with the outer ends of the spreaders 22 are in the form of metal pads 73 containing electrical coils 74, these several heater elements being shown in Fig. 4 as connected in series with the wires 75 and 76 which would lead from any suitable source of electric current supply.

In the arrangement shown the hood member 43 is provided at its apex with an upwardly extending bar 77 which slides vertically in the cross bar 78 of a frame 79 rising from the bench-top 42, and is connected at its upper end with a cable 80 trained over a pulley 81 depending from the ceiling and over a pulley 82 secured to the frame 79, respectively, the outer end of the cable 80 being provided with a weight 83 and a ring 84 which latter the operator grasps to pull on the cable and lift the hood member 43 to a position in which the umbrella unit assembled by the apparatus, may be removed therefrom and the parts to form another umbrella unit applied to position. The weight 83 is not sufficient to counterbalance the hood member 43 so that the latter, unless restrained, automatically lowers to its lowermost position. To hold the head member in raised position the ring 84 may be hooked over a pin 85 on the bench.

To insure the registration at all times of the pads 73 with the outer ends of the spreaders 22 any suitable means are provided for preventing the hood member 43 from turning, those shown for this purpose comprising vertical pairs of stationary guide rods 86 secured to the frame 79 at opposite sides of the apparatus and lugs 87 on the hood member which extend guidingly between the rods of the pairs thereof, with pins 88 on the lugs 87 at opposite sides of each pair of the guide rods 86 to steady the hood against lateral movement.

While I have illustrated and described a certain particular construction of umbrella and apparatus embodying my invention I do not wish to be understood as intending to limit it thereto as the umbrella and apparatus may be variously modified and altered and the invention embodied in other forms of construction without departing from the spirit of the invention. Furthermore, while I have illustrated and described a certain particular way of practicing my improved method and by a particular form of apparatus, I do not wish to be understood as intending to limit it thereto as the method disclosed may be variously altered and practiced by the use of other forms of apparatus without departing from the spirit of my invention.

What I claim as new and desire to secure by Letters Patent is:

1. In an umbrella having a shaft, a collapsible canopy of flexible material associated with said shaft, spreaders operative to condition said canopy for use and means connecting said spreaders together at their inner ends for sliding movement on said shaft, a device operating automatically to releasably hold said spreaders against retrograde movement from any position to which they are moved along the shaft in the conditioning of the canopy for use.

2. In an umbrella having a shaft, a collapsible canopy of flexible material associated with said shaft, spreaders operative to condition said canopy for use and means connecting said spreaders together at their inner ends for sliding movement on said shaft, said spreaders operating when their inner ends are moved away from said canopy to condition said canopy for use, means operating automatically to releasably hold said spreaders against retrograde movement from any position to which they are moved along the shaft in the conditioning of the canopy for use.

3. In an umbrella having a shaft, a collapsible canopy of flexible material associated with said shaft, spreaders operative to condition said canopy for use and means connecting said spreaders together at their inner ends for sliding movement on said shaft, means movable with said spreaders and operating automatically to releasably clutch said shaft and hold said spreaders against retrograde movement from any position to which they are moved along the shaft in the conditioning of the canopy for use.

4. In an umbrella having a shaft, a collapsible canopy of flexible material associated with said shaft, spreaders operative to condition said canopy for use and means connecting said spreaders together at their inner ends for sliding movement on said shaft, said spreaders operating when their inner ends are moved away from said canopy to condition said canopy for use, a device movable with said spreaders operating automatically to releasably hold said spreaders against retrograde movement from any position to which they are moved along the shaft in a direction away from said canopy in the conditioning of the canopy for use and releasable to permit said canopy to be collapsed, by force applied by the operator against said device in a direction toward said canopy.

5. The method of securing the canopy of an umbrella to the outer ends of spreaders on the shaft of the umbrella which comprises heat-sealing the canopy at its margin to the spreaders.

6. The method of securing the canopy of an umbrella to the outer ends of spreaders and a terminal spider member on the shaft of the umbrella which comprises heat-sealing the canopy at its margin to the spreaders and at its central portion to said spider member.

7. Apparatus for the purpose set forth, comprising a base of conical form having upwardly opening grooves to receive and seat the spreaders of an umbrella, said grooves radiating from an opening at the apex of said base for the shaft of the umbrella.

8. Apparatus for the purpose set forth, comprising a base member of conical form having upwardly opening grooves to receive and seat the spreaders of an umbrella, said grooves radiating from an opening at the apex of said base member for the shaft of the umbrella, a hood member having a conical portion conforming generally to the conical shape of said base member and adapted to fit over a canopy-forming conical element positioned on said spreaders and means for heating one of said members for sealing said canopy-forming element and spreaders together.

9. Apparatus for the purpose set forth, comprising a base of conical form having upwardly opening grooves to receive and seat the spreaders of an umbrella, said grooves radiating from an opening at the apex of said base for the shaft of the umbrella and a support adjacent the inner ends of said grooves for a spider member on the shaft of the umbrella.

10. Apparatus for the purpose set forth, comprising a base member of conical form having upwardly opening grooves to receive and seat the spreaders of an umbrella, said grooves radiating from an opening at the apex of said base member for the shaft of the umbrella, a support adjacent the inner ends of said grooves for a spider element on the shaft of the umbrella, a hood member having a conical portion conforming generally to the conical shape of said base member at its apex portion and adapted to fit over a canopy-forming conical element positioned on said spider element and means for heating one of said members for sealing said canopy-forming element and spider element together.

11. Apparatus for the purpose set forth, comprising a base member of conical form having upwardly opening grooves to receive and seat the spreaders of an umbrella, said grooves radiating from an opening at the apex of said base member for the shaft of the umbrella, a support adjacent the inner ends of said grooves for a spider element on the shaft of the umbrella, a hood member having a conical portion conforming generally to the conical shape of said base member and adapted to fit over a canopy-forming conical element positioned on said spider element and spreaders and means for heating one of said members for sealing said canopy-forming element, spider element and spreaders together.

12. An apparatus according to preceding claim 9 characterized by the hood member being mounted for reciprocal movement toward and away from said base.

13. An apparatus according to preceding claim 11 characterized by the hood member being mounted for reciprocal movement toward and away from said base member.

14. Apparatus for the purpose set forth, comprising a base member of conical form having upwardly opening grooves to receive and seat the spreaders of an umbrella, said grooves radiating from an opening at the apex of said base member for the shaft of the umbrella, a support adjacent the inner ends of said grooves for a spider element on the shaft of the umbrella, a hood member reciprocably supported for movement toward and away from said base member having a conical portion conforming generally to the conical shape of said base member and adapted to fit over a canopy-forming conical element positioned on said spider element and spreaders and means for heating one of said members for sealing said canopy-forming element, spider element and spreaders together.

15. Apparatus for the purpose set forth, comprising a base of conical form having upwardly opening grooves to receive and seat the spreaders of an umbrella, said grooves radiating from an opening at the apex of said base for the shaft of the umbrella, and a sectional support adjacent the inner ends of said grooves for a spider member on the shaft of the umbrella, the sections of said support being radially movable.

16. Apparatus for the purpose set forth, comprising a base member of conical form having upwardly opening grooves to receive and seat the spreaders of an umbrella, said grooves radiating from an opening at the apex of said base member for the shaft of the umbrella, a sectional support adjacent the inner ends of said grooves for a spider element on the shaft of the umbrella, the sections of said support being radially movable, a hood member having a conical portion conforming generally to the conical shape of said base member and adapted to fit over a canopy-forming conical element positioned on said spider element and spreaders and means for heating one of said members for sealing said canopy-forming member and spider member together.

17. Apparatus for the purpose set forth, comprising a base member of conical form having upwardly opening grooves to receive and seat the spreaders of an umbrella, said grooves radiating from an opening at the apex of said base for the shaft of the umbrella, a sectional support adjacent the inner ends of said grooves for a spider element on the shaft of the umbrella, the sections of said support being radially movable, a hood member reciprocably supported for movement toward and away from said base member and having a conical portion conforming generally to the conical shape of said base member and adapted to fit over a canopy-forming conical element positioned on said spider element and spreaders and means for heating one of said members for sealing said canopy-forming member and spider member together.

18. The method of securing the canopy of an umbrella to the outer ends of spreaders and a terminal spider member on the shaft of the umbrella which comprises simultaneously heat-sealing the canopy at its margin to the spreaders and at its central portion to said spider member.

19. In a structure having a shaft member and a sleeve member on said shaft member, and in which structure said members are relatively movable lengthwise thereof, a clip device for releasably holding said members from relative movement in one direction while permitting such movement in the opposite direction, comprising a spring strip having apertures through which said sleeve member and said shaft member, beyond said sleeve member, extend, respectively, said strip being bowed and engaging said sleeve member and shaft member under spring tension.

20. In an umbrella having a shaft, a collapsible canopy and means for opening and closing the umbrella, a flexible spider member on the upper end of said shaft presenting radial arms, said canopy being connected at its central portion to said spider member.

21. In an umbrella having a collapsible canopy, a shaft and spreaders, a spider member having radial arms secured to the upper end of said shaft, said canopy being connected at its center to said spider member and at its margin to said spreaders.

22. In an umbrella having a collapsible canopy, a shaft and spreaders, a spider member having radial arms secured to the upper end of said shaft, said canopy being heat-sealed at its center to said canopy and at its margin to said spreaders.

23. In an umbrella having a shaft, a canopy of fibrous sheet material carried by said shaft and means for opening and closing the umbrella, a coating of hydrochlorinated rubber on said sheet said means comprising members heat-sealed to said canopy at its outer margin.

24. In an umbrella having a shaft, a canopy formed of fibrous sheet material carried by said shaft and means for opening and closing the umbrella, a spider member on the upper end of said shaft to which said canopy is heat-sealed, said means comprising members heat-sealed to said canopy at its outer margin.

25. In an umbrella having a shaft, a collapsible canopy, spreaders operative to condition said canopy for use, and a flanged tubular member slidable on said shaft and about which said spreaders at their inner ends are grouped, means tying the inner ends of said spreaders together independently of said tubular member.

26. In an umbrella having a shaft, a collapsible canopy, spreaders operative to condition said canopy for use, and a flanged tubular member slidable on said shaft and about which said spreaders at their inner ends are grouped, the inner ends of said spreaders having openings, a member threaded through said openings for securing said spreaders together at their inner ends.

27. In an umbrella having a collapsible canopy, a shaft and spreaders, a member secured to the upper end of said shaft, said canopy being heat-sealed at its center to said member and at its margin to said spreaders.

28. The method of securing the canopy of an umbrella to the outer ends of spreaders and a terminal member on the shaft of the umbrella which comprises heat-sealing the canopy at its margin to the spreaders and at its central portion to said member.

29. In an umbrella having a collapsible canopy, a shaft and separate spreaders, the feature of the canopy being heat-sealed to said spreaders.

WILLIAM S. TIMBLIN.

CERTIFICATE OF CORRECTION.

Patent No. 2,341,399. February 8, 1944.

WILLIAM S. TIMBLIN.

It is hereby certified that error appears in the printed specification of the above numbered patent requiring correction as follows: Page 1, second column, line 31, for "means 32" read --means 24--; page 5, second column, line 27, claim 17, after "base" insert --member--; and that the said Letters Patent should be read with this correction therein that the same may conform to the record of the case in the Patent Office.

Signed and sealed this 16th day of May, A. D. 1944.

Leslie Frazer (Seal)                  Acting Commissioner of Patents.